US012786028B2

(12) United States Patent
M A N S et al.

(10) Patent No.: US 12,786,028 B2
(45) Date of Patent: Nov. 3, 2026

(54) SYSTEM AND METHOD FOR PROVIDING BROADCAST TRANSMITTER SPECIFIC PILOTS IN SYNCHRONIZED BROADCAST NETWORKS

(71) Applicant: TEJAS NETWORKS LIMITED, Begur Hobli (IN)

(72) Inventors: Raghavendra M A N S, Bengaluru (IN); Subrahmanya K S, Bengaluru (IN)

(73) Assignee: TEJAS NETWORKS LIMITED, Bengaluru (IN)

( * ) Notice: Subject to any disclaimer, the term of this patent is extended or adjusted under 35 U.S.C. 154(b) by 598 days.

(21) Appl. No.: 18/110,312

(22) Filed: Feb. 15, 2023

(65) Prior Publication Data

US 2024/0097958 A1 Mar. 21, 2024

(30) Foreign Application Priority Data

Sep. 16, 2022 (IN) ............................ 202241052926

(51) Int. Cl.

| | |
|---|---|
| ***H04H 20/71*** | (2008.01) |
| ***H04L 5/00*** | (2006.01) |
| ***H04L 27/26*** | (2006.01) |

(52) U.S. Cl.

CPC ....... *H04L 27/26136* (2021.01); *H04H 20/71* (2013.01); *H04L 5/0048* (2013.01)

(58) Field of Classification Search

CPC ........ H04H 20/67; H04H 20/71; H04H 60/44; H04J 11/005; H04L 27/26035; H04L 27/26134; H04L 27/26136; H04L 5/0048

See application file for complete search history.

(56) References Cited

U.S. PATENT DOCUMENTS

2008/0219371 A1 * 9/2008 Hong ................ H04L 25/03821 375/346
2023/0318726 A1 * 10/2023 Hong .................. H04B 7/0413 455/3.01
2024/0171437 A1 * 5/2024 Ma ...................... H04L 27/2614

FOREIGN PATENT DOCUMENTS

WO WO-2011035439 A1 * 3/2011 ........... H04B 7/0456

* cited by examiner

*Primary Examiner* — Asad M Nawaz
*Assistant Examiner* — Natali Pascual Peguero
(74) *Attorney, Agent, or Firm* — HSML P.C.

(57) ABSTRACT

A single frequency-based broadcast communication system includes a desired broadcast transmitter and one or more adjacent interfering broadcast transmitters in communication with a receiver over a communication channel is provided. Each of the broadcast transmitters includes a waveform generator for transmitting broadcast transmitter specific pilot signals to the receiver for receiving a superimposed transmitted broadcast transmitter specific pilot signal. The desired broadcast transmitter includes a pilot insertion module and a precoding filter module. The precoding filter module is designed to generate a transmitter specific precoding sequence based on a computed location index for specific pilot signals in a time frequency domain and precode a reference pilot signal to obtain the broadcast transmitter specific pilot signal sequences.

13 Claims, 11 Drawing Sheets

SYSTEM AND METHOD FOR PROVIDING BROADCAST TRANSMITTER SPECIFIC PILOTS IN SYNCHRONIZED BROADCAST NETWORKS

BACKGROUND

Technical Field

The embodiment herein generally relates to an OFDM/OFDMA (Orthogonal Frequency Division Multiplexing/Orthogonal Frequency Division Multiple Access) based communication system providing broadcast services, and more particularly to a system and a method for providing broadcast transmitter specific pilots for performing channel estimation corresponding to a desired transmitter and interfering transmitters, in the frequency reuse one based broadcast communications networks.

Description of the Related Art

A pilot signal (reference signal) is commonly used in communication systems to enable a receiver to perform several critical functions, including but not limited to, the acquisition and tracking of timing and frequency synchronization, the estimation, and tracking of desired channels for subsequent demodulation and decoding of the information data, the estimation, and monitoring of the characteristics of other channels for handoff, interference suppression, etc.

In a broadband communication/unicast communication, traditionally, each base station is equipped with a unique pilot pattern and/or pilot sequences called as reference signals. The base station specific pilots can be generated using Base station specific ID (BSID). The receiver can then use this BSID for obtaining local reference signals for channel estimation. This idea is incorporated in standards such as LTE. In Broadcast networks, the equivalent of BSID is the Transmitter ID (TxID). However, in broadcast standard, with synchronized broadcast communication as in Single Frequency networks (SFN), reference pilots in each subframe are not transmitter specific as they are not generated based on TxID, and hence they are common, both in terms of modulation value and position, across all the broadcast transmitters in a coverage area.

Communication of transmitter specific data using existing synchronized broadcast frameworks will lead to severe co-channel interference and hence cannot support the co-existence of SFN and Reuse-1 communication and/or reliable reception at the intersection of two or more SFN networks.

FIG. 1 illustrates an example communication scenario with co-channel interference, according to a prior art. According to FIG. 1, the co-channel interference is experienced by a receiver 102, due to reuse of the same frequency band across all the seven adjacent broadcast transmitters 104A-104F. Interference aware receiver strategies require knowledge of channel frequency response (CFR) of the desired channel and interfering channels. Without accurate knowledge of the individual channel impulse and/or frequency responses, there will be severe degradation in the demodulation performance. The pilot-aided channel estimation strategies used in interference scenarios rely on the orthogonality or cross-correlation between pilot patterns of the desired and interfering frames. However, wireless standards like ATSC 3.0, DVB-T2, eMBMS/FeMBMS for MBSFN, etc., do not facilitate broadcast transmitter specific orthogonal scatter pilots, for individual channel estimation, as they operate in Single Frequency Network (SFN) mode. In the frequency reuse-one scenario, each transmitter/SFN cluster in a network can have interference from neighboring transmitters/clusters 104*b*-104*g*. The channel estimation using the existing pilots of broadcast standards (including the pre-distorted) will result in the estimation of the composite channel frequency response. This will result in the performance degradation at the receiver, even in the presence of more robust modulation and coding (MODCOD).

FIGS. 2A-2C are block diagrams of a broadcast exciter of the broadcast transmitter chain, according to a prior art illustration. The broadcast exciter is a system of signal processing modules that are responsible for the formation of broadcast frames according to the protocol. Here FIG. 2A represents broadcast exciter (transmitter) chain according to ATSC 3.0, FIG. 2*b* represents broadcast exciter (transmitter) chain as per the DVB-T2 standard. FIG. 2C represents the broadcast transmitter chain as per the 3GPP eMBMS/FEMBMS standard. Referring to FIGS. 2A, 2B and 2C, the main blocks in the exciter chain are categorized into the following modules. An input formatting module 202, a BICM (Bit-interleaved coding and modulation) module 204, an LDM combining module 206 (Layer Mapper in eMBMS), a MIMO precoding module 208, and a Waveform generation module 212. A Framing and Interleaving Module 210 that is specific to broadcasting standards like ATSC, DVB. The BICM module 204 includes forward error correction modules, related bit-interleaving, and a symbol mapping module. eMBMS/FeMBMS uses rate ⅓ Turbo codes and DVB-T2, ATSC 3.0 uses LDPC and BCH and/or CRC as the forward error correction methods. LDPC code word lengths of 64800 or 16200 are supported. ATSC 3.0 Symbol mapping uses non-uniform constellation and supports mapping from QPSK to 4096 QAM. Unlike DVB-T2 and FeMBMS, ATSC 3.0 supports layer division multiplexing. The LDM combining module 206 combines two coded and mapped user payloads into a single stream. The MIMO Precoding module 208 is an optional technology block to support MIMO. The Framing and Interleaving module 210 consists of three parts, Time interleaving, Framing, and Frequency interleaving.

The time interleaver spreads mapped payload symbols across time, thus providing time diversity. The frequency interleaver shuffles mapped symbols within an OFDM symbol, providing frequency diversity and the framing allocates user symbols to OFDM subcarriers resulting in OFDM symbols. Further, it groups OFDM symbols to form a frame or subframe. Sub carrier cell allocation can be TDM, FDM, LFDM, FLDM, etc.

Further, referring to FIGS. 2*a*, 2*b*, and 2*c*, the modules 212 (after the frequency interleaver block in 2*a*, 2*b*, and after Precoding in FIG. 2*c*) can be considered as part of waveform generation. The waveform generation module 212 typically includes Pilots, IFFT, Guard interval insertion modules as major submodules. Pilots' insertion block inserts different types of pilots, each intended to serve different functions in the receiver. Pilot location, subcarrier index, and the modulation values are predefined/obtained from spacing parameters that are communicated to the receiver. To facilitate the ease of communication in SFN mode, scatter/reference pilot location and modulation values are designed to be independent of the broadcast transmitter or and hence they are same across all the transmitters. The IFFT converts frequency domain data to time domain.

Broadcast standards like ATSC 3.0, DVB-T2, etc., support the use of MISO precoding to avoid potential destructive interference at the receiver in SFN mode. However, the conventional precoding filters do not guarantee orthogonality of pilots in the frequency domain.

Accordingly, to support the coexistence of a single frequency network (SFN) and frequency reuse-one in broadcast networks and to facilitate accurate individual channel estimation, there is a need for generation and communication of broadcast transmitter specific pilot signals (SFN group specific pilot signals) for channel estimation in interference-free and interference limited regions without making changes to the existing broadcast standard framework.

The above information disclosed in this background section is only for enhancement of understanding the background of the present disclosure, and therefore it may contain information that does not form the prior art.

SUMMARY

In view of the foregoing, the embodiments herein provide a Single frequency-based communication system including a desired broadcast transmitter and one or more adjacent interfering broadcast transmitters that are in communication with a receiver over a wireless communication channel. Each of the broadcast transmitters includes an exciter for transmitting broadcast transmitter specific pilot signals to the receiver and the receiver for receiving a superimposed signal of the transmitted broadcast transmitter specific pilot signals. The desired broadcast transmitter is one of the broadcast transmitters from which receiver intends to receive data. The desired broadcast transmitter and each adjacent interfering broadcast transmitter includes a pilot insertion module and a precoding filter module. The precoding filter module is adapted to generate a transmitter specific precoding sequence from a plurality of precoding sequences based on a computed location index for specific pilot signals in a time frequency domain. The precoding filter module is adapted to precode a reference pilot signal to obtain the broadcast transmitter specific pilot signal sequences, based on the plurality of precoded sequences.

In some embodiments, precoding of the reference pilot signal includes obtaining broadcast transmitter specific pilot modulation values that are orthogonal or quasi-orthogonal to the other pre-coded pilot signals of adjacent broadcast transmitters in the frequency domain.

In some embodiments, the receiver on receiving the superimposed broadcast transmitter specific pilot signal sequence transmitted from the desired broadcast transmitter and at least one of the adjacent interfering broadcast transmitters are adapted to (i) extract a sub-carrier location value from a computed location index of the broadcast transmitter specific signal sequence, (ii) obtain one or more precoding filter coefficients based on the broadcast transmitter specific pilot location value, (iii) compute an estimate of Channel Frequency Responses (CFR) corresponding to the desired broadcast transmitter and the one or more adjacent interfering broadcast transmitters, based on the extracted pilot sub carrier values and the broadcast transmitter specific pilot sequences and (iv) compute an individual channel estimate for the plurality of data sub carriers and obtain Channel Frequency Response (CFR) and a Channel Impulse Response (OR) of desired and interfering channels.

In some embodiments, the receiver is adapted to estimate the channels corresponding to the desired broadcast transmitter and the one or more adjacent interfering broadcast transmitters. The receiver includes a pilot extraction module, a channel estimation module, and a data-carrier channel estimation module. The pilot extraction module is configured to extract the received pilot sequence from the pilot locations obtained for a specific time-frequency domain. The obtained pilot locations correspond to superimposed pilot values of the desired broadcast transmitter and the one or more adjacent interfering broadcast transmitters. The channel estimation module is configured to estimate a channel frequency response (CFR) of the desired broadcast transmitter and the one or more adjacent interfering broadcast transmitters, from the extracted pilot sequence. The data carrier channel estimation module is configured to obtain one or more channel estimates corresponding to data subcarriers based on a channel frequency response estimated at the pilot locations.

In some embodiments, the channel estimation module estimates the channel frequency responses of the desired broadcast transmitter and the one or more adjacent interfering broadcast transmitters based on a location of one or more pre-distorted pilots in a time-frequency domain.

In some embodiments, the pilot sequence generation module of the transmitter is further adapted to generate broadcast transmitter specific pilot sequences using at least one of one or more sequence generators at different broadcast transmitters and Single Frequency Network (SFN) clusters.

In some embodiments, the broadcast transmitter specific pilot sequences include one of orthogonal pilot sequences or uncorrelated pilot sequences between the first broadcast transmitter and the second broadcast transmitter. The orthogonal pilot sequences or uncorrelated pilot sequences are generated using sequence generators with different sequence generator polynomials.

In some embodiments, the pilot sequence generation module of the transmitter is further adapted to generate broadcast transmitter specific pilot sequences using at least one of a pilot reference generator and a broadcast transmitter specific transmitter identity (TxID) sequence, where the broadcast transmitter specific pilot sequences are orthogonal pilot sequences or uncorrelated pilot sequences.

In one aspect, a method performed by a Single frequency-based broadcast communication system is provided. The Single frequency-based broadcast communication system includes one or more broadcast transmitters in communication with a receiver over a communication channel. Each of the broadcast transmitters includes a waveform generator for transmitting broadcast transmitter specific pilot signals to the receiver for receiving a superimposed broadcast transmitter specific pilot signal, characterized in that, a desired broadcast transmitter is one of the broadcast transmitters from which mobile station intends to receive data and each broadcast transmitter includes a pilot insertion module and a precoding filter module. The method includes (i) generating a transmitter specific precoding sequence from a plurality of precoding sequences based on a computed location index for specific pilot signals in a time frequency domain and (ii) precoding a reference pilot signal to obtain the broadcast transmitter specific pilot signal sequences, based on the plurality of precoded sequences.

In some embodiments, precoding of one or more pilot signals comprises obtaining broadcast transmitter specific pilot modulation values that are orthogonal or quasi-orthogonal to the other pre-coded pilot signals of adjacent broadcast transmitters in a frequency domain.

In some embodiments, the method further includes extracting, by the receiver, a sub-carrier location value at a computed location index of the broadcast transmitter specific signal sequence, obtaining, by the receiver, one or more precoding filter coefficients based on the broadcast transmitter specific pilot location value, computing, by the receiver, channel estimates corresponding to the desired broadcast transmitter and the one or more adjacent interfering broadcast transmitters, based on the extracted sub carrier values and the broadcast transmitter specific pilot sequences, and performing, by the receiver, a channel estimation of desired channel and one or more interfering channels for the one or more data subcarriers by computing, by the receiver, an individual channel estimates for one or more data sub carriers.

In some embodiments, the method of performing channel estimation of one or more interfering channels includes extracting, by a pilot extraction module of the receiver, the received superimposed pilot sequence values from one or more pilot locations obtained for a specific time-frequency domain, where the pilot locations correspond to received superimposed pilot values of a desired broadcast transmitter and an interfering channel, estimating, by a channel estimation module of the receiver, channel estimates of the desired broadcast transmitter and the interfering channels at the extracted pilot location and obtaining, by a data carrier channel estimation module of the receiver, one or more channel estimates corresponding to data subcarriers based on channel estimates at reference pilot location.

In some embodiments, estimating the channel response of desired base station and an adjacent interfering broadcast transmitter is performed based on a location of the one or more pre-distorted pilots in the time-frequency domain.

In alternate embodiments, the method includes generating, by the pilot sequence generation module, the broadcast transmitter network) specific pilot sequences using at least one of one or more sequence generators at different broadcast transmitters and Single Frequency Network (SFN) clusters.

In some embodiments, the broadcast transmitter specific pilot sequences include one of orthogonal pilot sequences or uncorrelated sequences between a first adjacent interfering broadcast transmitter and a second adjacent interfering broadcast transmitter. In alternate embodiments, the orthogonal pilot sequences or uncorrelated pilot sequences are generated using sequence generators with different sequence generator polynomials.

In alternate embodiments, the method includes generating, by the pilot sequence generation module, the broadcast transmitter specific pilot sequences using at least one of a pilot reference generator and a broadcast transmitter specific transmitter identity (TxID) sequence, where the broadcast transmitter specific pilot sequences are orthogonal pilot sequences or uncorrelated pilot sequences.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein are adapted to generate broadcast transmitter specific pilot signals for channel estimation in interference-free and interference-limited regions to address the issue of orthogonality or quasi-orthogonality of pilot sequences in frequency domain, in a broadcasting framework.

The embodiments herein are intended for standards that do not support broadcast transmitter specific pilots for channel estimation in SFN. This includes the broadcast standards such as ATSC, DVB-T2, eMBMS/FeMBMS for MBSFN, etc., In particular, the solution is intended for broadcast in frequency reuse-one mode in SFN network (Coexistence of SFN and Frequency Reuse-One). Moreover, the embodiments herein are applicable to any wireless standard that does not support broadcast transmitter network) specific pilots in synchronized broadcast communications based SFN.

According to an embodiment herein, the description is provided considering the wireless standards such as ATSC, DVB-T2, eMBMS/FeMBMS, etc., where broadcast transmitter network) specific pilots are not transmitted in each subframe in SFN mode.

Figure 1:
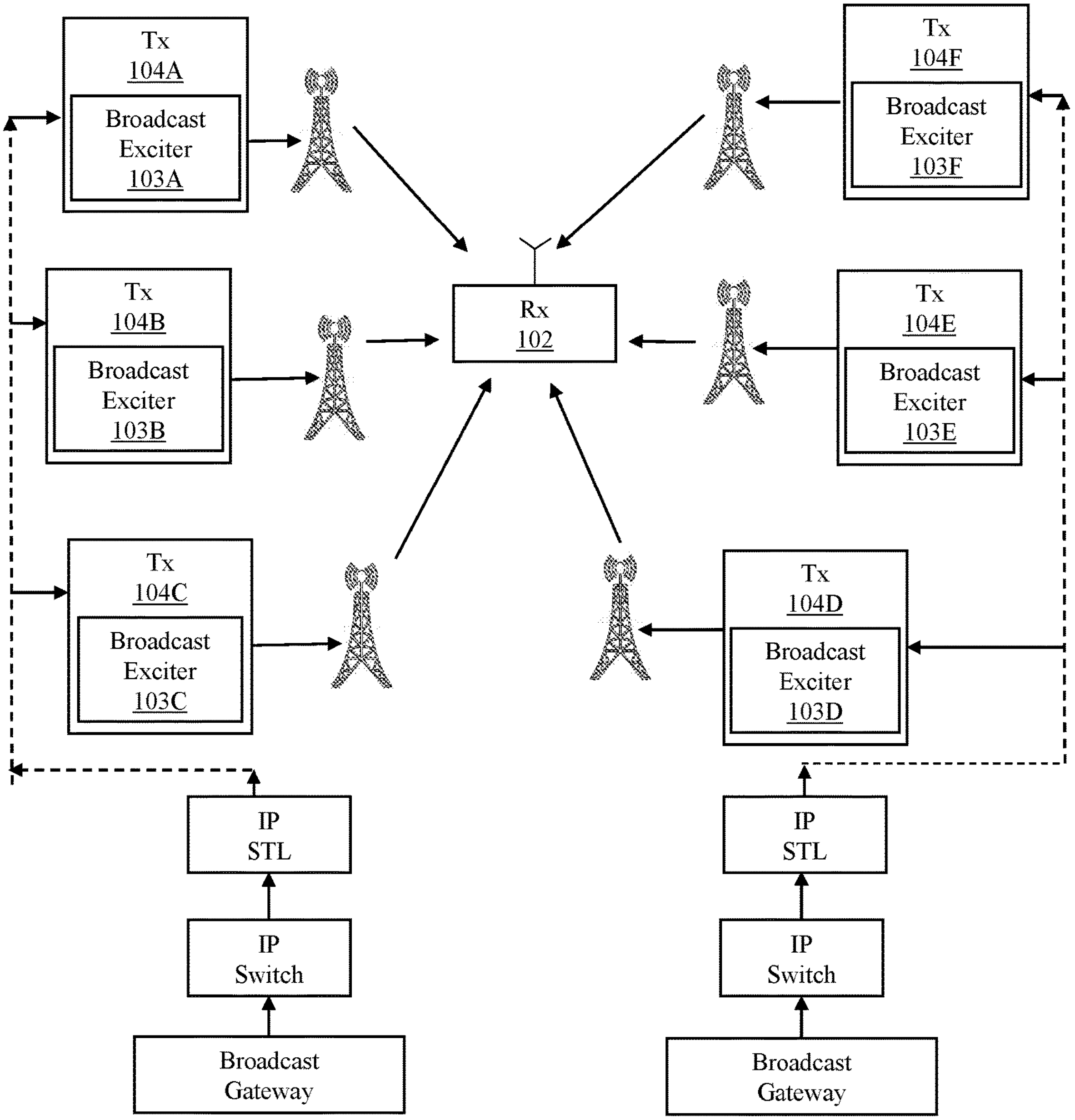
FIG. 1 (Prior Art)
FIG. 1 illustrates an OFDM based Single frequency communication system with co-channel interference, according to a prior art.
Figure 2A:
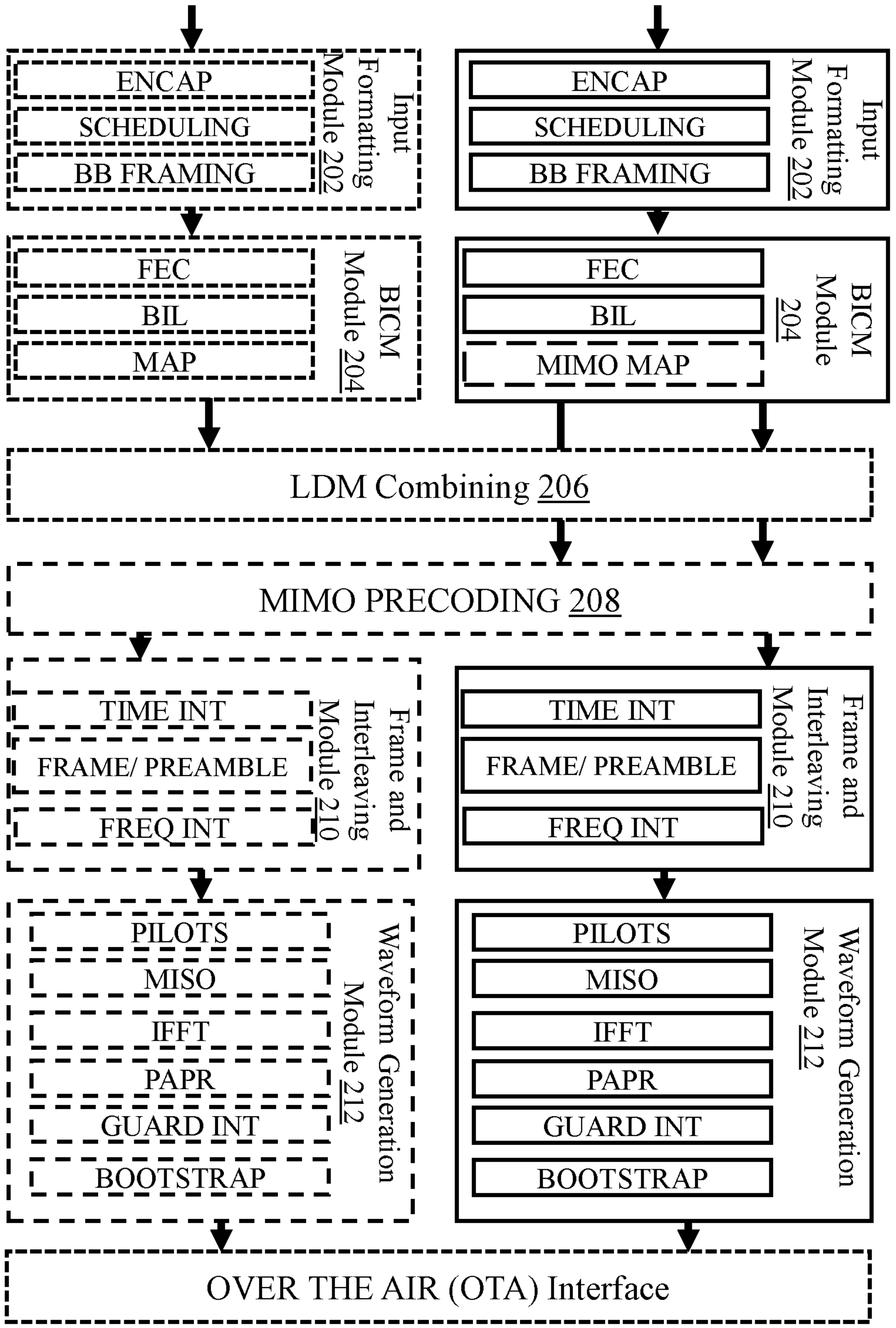
FIG. 2a (Prior Art)
FIGS. 2A-2C are block diagrams of a broadcast exciter chain, according to prior art.
Figure 2B:
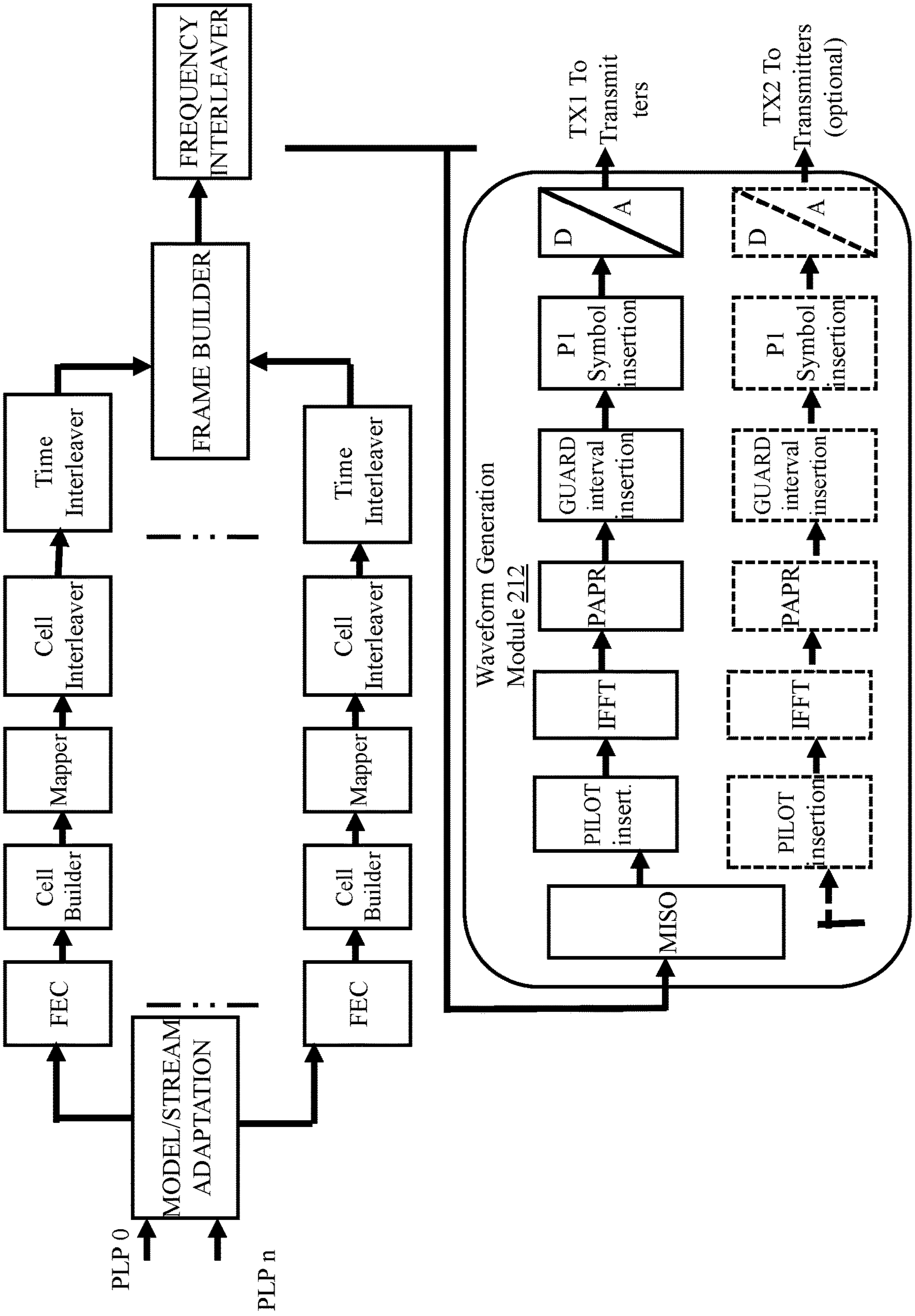
FIG. 2b (Prior Art)
Figure 2C:
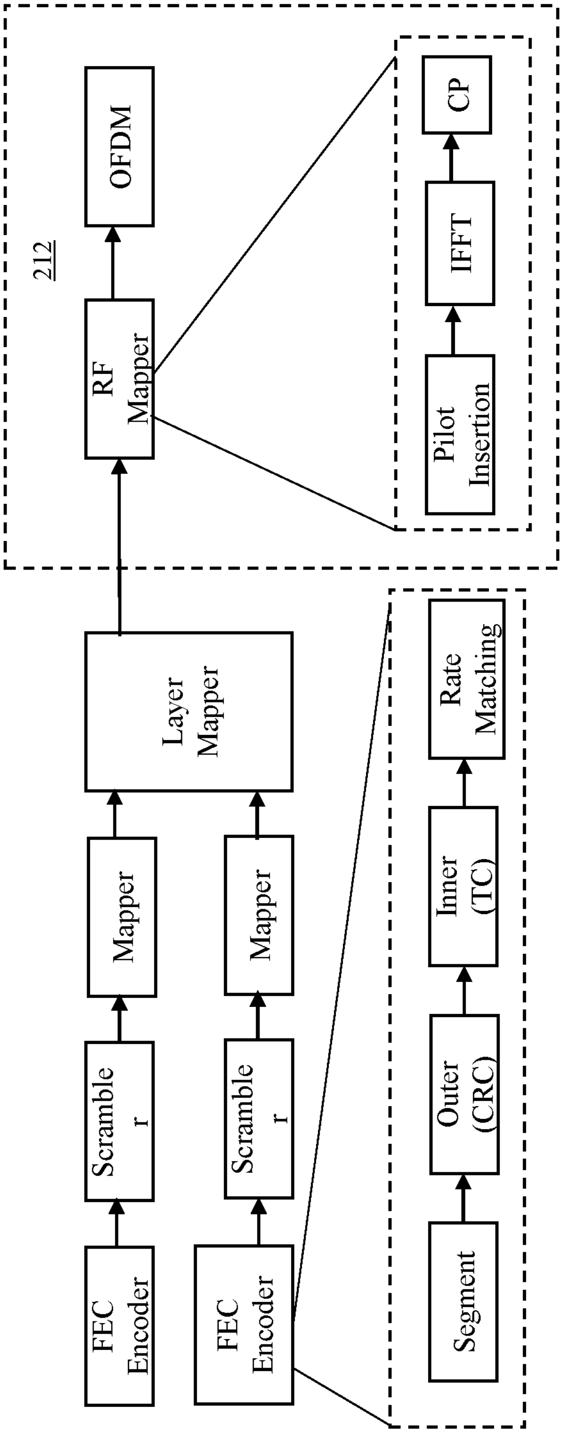
FIG. 2C (Prior Art)
Figure 3:
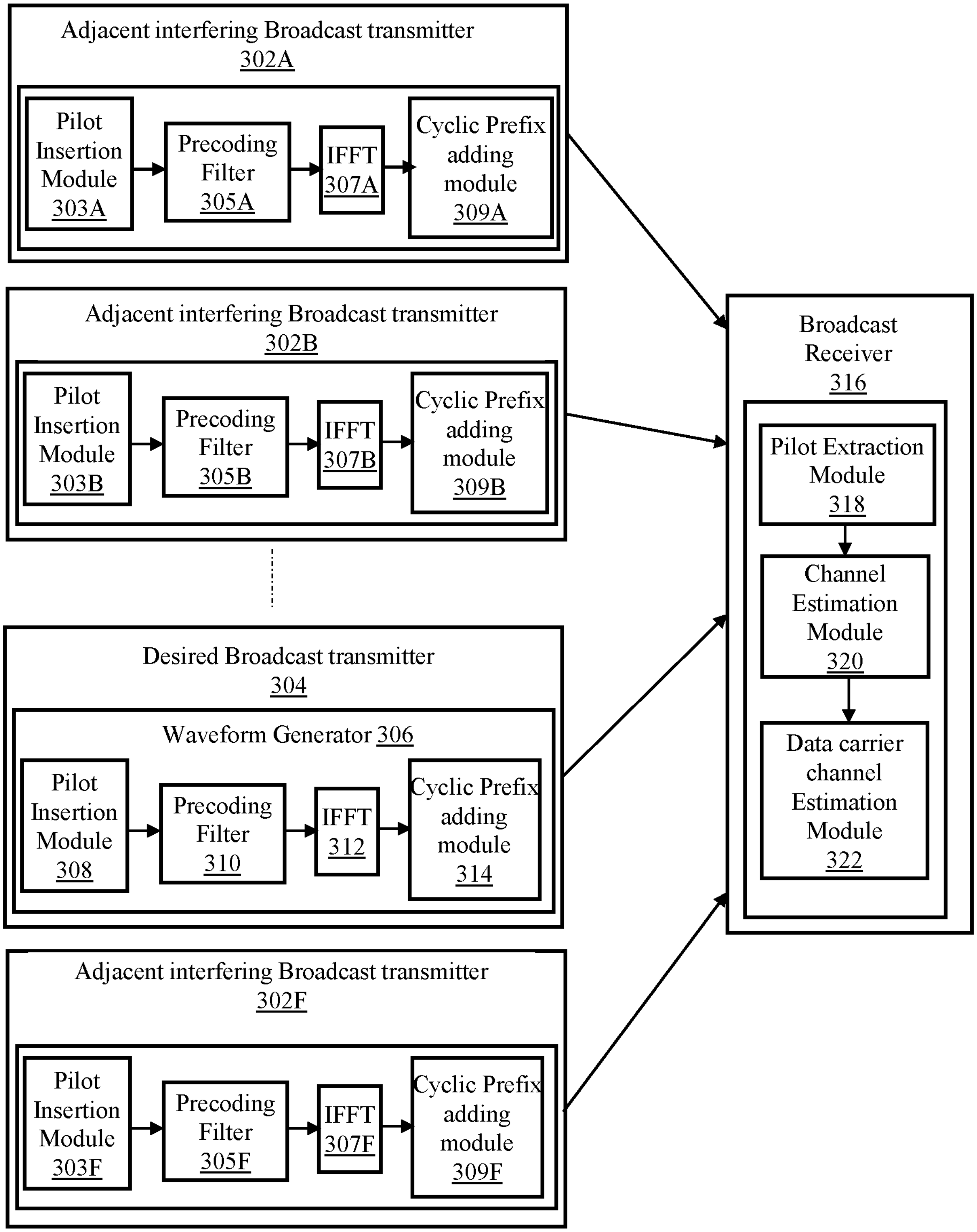
FIG. 3 is a block diagram of a Single frequency-based broadcast communication system that utilizes pilot transmissions, according to some embodiments herein.

FIG. 3 is a block diagram of a Single frequency-based broadcast communication system 300 that utilizes pilot transmissions, according to some embodiments herein. The Single frequency-based broadcast communication system 300 includes a desired broadcast transmitter 304 and one or more adjacent interfering broadcast transmitters 302A-302F in communication with a receiver 316 over a communication channel. The desired broadcast transmitter 304 includes a waveform generator 306 for transmitting broadcast transmitter specific pilot signals to a receiver 316 for receiving superimposed transmitted broadcast transmitter specific pilot signals. The desired broadcast transmitter 304 is one of the transmitters from which the mobile station 312 intends to receive transmitter specific data. Each adjacent interfering broadcast transmitter 302A-302F includes a pilot insertion module 303*a*-303*f* and a precoding filter module 305A-305F. Each adjacent interfering broadcast transmitter 302*a*-302*f* further includes IFFTs 307A-307F and cyclic prefix adding modules 309*a*-309*f*. The desired broadcast transmitter 304 includes a pilot insertion module 308 and a precoding filter module 310. The desired broadcast transmitter 304 further includes an IFFT 312 and a cyclic prefix adding module 314. The IFFT module 312 is used to realize the OFDM modulation, at the transmitter. The cyclic prefix module 314 is used to prefix the OFDM symbol generated at the output of IFFT module 312. This is done to overcome inter-symbol interference (ISI) due to multipath propagation environment. Conventionally, the prefix samples are the last $N_{cp}$ samples of the OFDM symbol resulting in cyclic extension of an OFDM symbol. The precoding filter module 310 of the desired broadcast transmitter 304 generates a transmitter specific precoding sequence from one or more precoding sequences based on a computed location index for specific pilot signals in a time frequency domain. The precoding filter module 310 further precodes a reference pilot signal to obtain the broadcast transmitter specific pilot signal sequences, based on the one or more precoded sequences.

The precoding of the reference pilot signal includes obtaining broadcast transmitter specific pilot modulation values that are orthogonal or quasi-orthogonal to the other pre-coded pilot signals of the one or more adjacent broadcast transmitters 302A-302F in a frequency domain.

The receiver 316 receives the broadcast transmitter specific pilot signal sequence transmitted from the desired broadcast transmitter 304 and at least one of the adjacent interfering broadcast transmitters 302A-302F, extracts a sub-carrier location value from a computed location index of the broadcast transmitter specific signal sequence. The data subcarrier location information is obtained from the $D_X$ and $D_Y$ values of a pilot pattern. From the $D_X$ and $D_Y$ values, a relative carrier k of a particular OFDM symbol l shall be a pilot carrier if it satisfies:

$$k \bmod (D_X D_Y) = D_X (l \bmod D_Y)$$

In some embodiments, the values of $D_X$ and $D_Y$ are conveyed to the receiver 316 using bootstrap or preamble of a frame. The receiver 316 may decode the bootstrap/preamble to understand the $D_X$ $D_Y$ values of subframes.

Further, the receiver 316 obtains one or more precoding filter coefficients based on the reference pilot location value. The receiver 316 then computes Channel estimates corresponding to the desired broadcast transmitter 304 and the one or more adjacent interfering broadcast transmitters 302A-302F, based on the extracted sub carrier values and the broadcast transmitter specific pilot sequences. The receiver 316 then computes channel estimates corresponding to the data subcarriers and then obtains individual Channel Frequency Response (CFR) and a Channel Impulse Response (CIR).

The receiver 316 includes a pilot extraction module 318, a channel estimation module 320, and a data carrier channel estimation module 322. The pilot extraction module 318 is configured to extract the received pilot sequence from the pilot locations obtained for a specific time-frequency domain. The pilot extraction module 318 extracts the pilot sequence from pilot locations based on one or more spacing parameters. Here the one or more spacing parameters include a frequency-direction spacing; and a time-direction spacing. The obtained pilot locations correspond to superimposed pilot values of the desired broadcast transmitter 304 and the one or more adjacent interfering broadcast transmitters 302A-302F.

The channel estimation module 320 is configured to estimate a channel frequency response (CFR) of the desired broadcast transmitter 304 and the one or more adjacent interfering broadcast transmitters 302A-302F from the extracted pilot sequence. The data carrier channel estimation module 322 is configured to obtain one or more channel estimates corresponding to data subcarriers based on a channel frequency response at the reference pilot location.

In some embodiments, the waveform generator 306 further includes a pilot sequence generation module that is adapted to generate broadcast transmitter reference pilot sequences using the pilot spacing parameters broadcast transmitter broadcast transmitter In some embodiments, the orthogonal pilot sequences or uncorrelated pilot sequences are generated using sequence generators with different sequence generator polynomials. The pilot insertion module 306 of the desired broadcast transmitter 304 is further adapted to generate broadcast transmitter specific pilot sequences using at least one of a pilot reference generator and a broadcast transmitter specific transmitter identity (TxID) sequence. The broadcast transmitter specific pilot sequences are orthogonal pilot sequences or uncorrelated pilot sequences.

Figure 4:
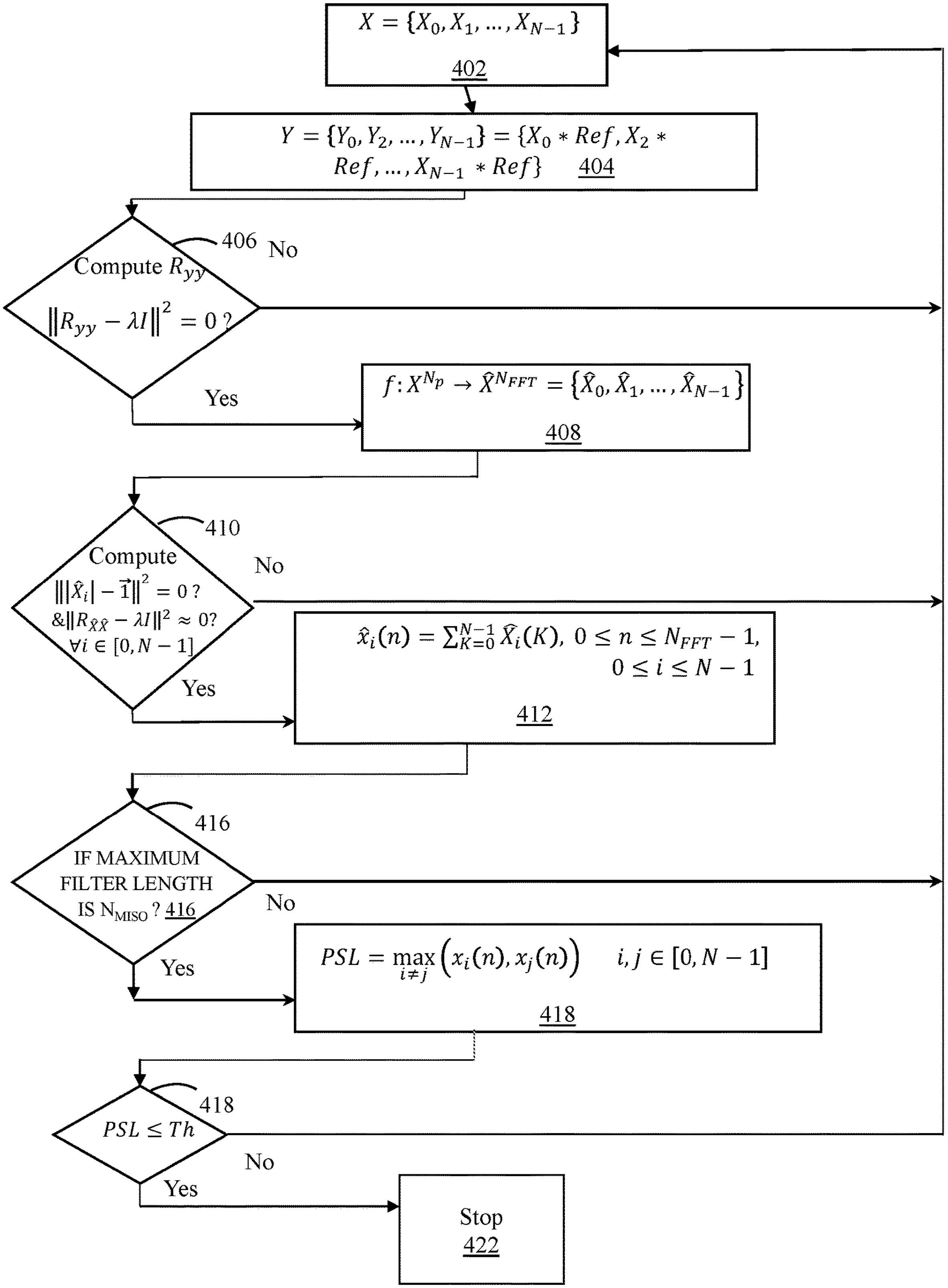
FIG. 4 is a block diagram illustrating a precoding filter module, according to some embodiments herein.

FIG. 4 is a flow diagram illustrating the functions of a precoding filter module, according to an embodiment herein. The precoding filter is initialized with a set of N number of bipolar all-pass sequences $X_j$, 0≤j≤N−1 each of length $$N_p = \left\lfloor \frac{NoC}{D_X D_Y} \right\rfloor,$$

at step 402. Here N is the number of broadcast transmitters (networks) in tier 1. This corresponds to the maximum number of transmitters that are in communication with the receiver 316 and transmitting individual data. Each vector is then passed through a multiplier and multiplied with pilot signals obtained for particular $D_X$, $D_Y$, at step 404. This will result in pre-distorted pilot vectors $Y_j$, 0≤j≤N−1. Then the orthogonality of the pre-distorted pilot signals is checked at step 406. Each vector $X_j$ is then interpolated to obtain $N_{FFT}$-length vectors $\hat{X}_j$ with elements of magnitude 1, at step 408. The interpolation is a non-linear mapping function such that $\hat{X}_j(p)=X_j(i)$. Here p represents pilot location index obtained from $D_X$ $D_Y$ and i∈[0, N−1]. This ensures that the data is left undistorted due to precoding. The precoding filter generator then checks if the correlation matrix of interpolated signal set $\hat{X}^{N_{FFT}}$ given by $R_{\hat{X}^{N}{}_{FFT}\hat{X}N^{N}{}_{FFT}}=\hat{X}^{N_{FFT}}(\widehat{\boldsymbol{X}}^{N_{FFT}})'$, is diagonally dominant or not, at step 410. This will facilitate the use of minimum mean square estimators for joint estimation of desired and interfering data. If the correlation matrix is diagonally dominant, then obtain the time domain filter $\hat{x}_j$, $0 \leq j \leq N-1$ at step 412. If the correlation matrix is not diagonally dominant, then modify the filter set at 402 and then proceed with steps 404-410. Further, if the correlation matrix is diagonally dominant, then consider the dominant paths (paths above defined threshold) for each filter and check if the maximum filter length is less than $$N_{MISO} = \frac{N_{cp}}{3}$$

or not, at step 416. Here $N_{cp}$ is the length of cyclic prefix. If maximum filter length is less than $N_{MISO}$, then compute Peak Side lobe level for each vector 418. At step 418, computes the Peak Side lobe level for each vector if PSL≤Th else the process is stopped at 422. If the maximum peak side lobe level of the set is less than the threshold, then go back to step 402, modify the filter, and repeat the process from step 404.

The output of a precoding filter generator module will be a set of N precoding vectors, that are uncorrelated/orthogonal in both time and frequency. The length of filters is in accordance with the standard, supporting the legacy receivers in SFN mode.

In SFN mode, the precoded OFDM symbols will be uncorrelated in time. In addition to this, in the reuse-1 mode the precoded OFDM symbols will have orthogonal pilots in frequency domain. Each vector is assigned to individual broadcast transmitters in SFN cluster or individual SFN clusters. The precoding filter of the embodiments herein facilitates the use of advanced receivers that work in co-channel interference regime supporting coexistence of SFN and Reuse-1.

Figure 5:
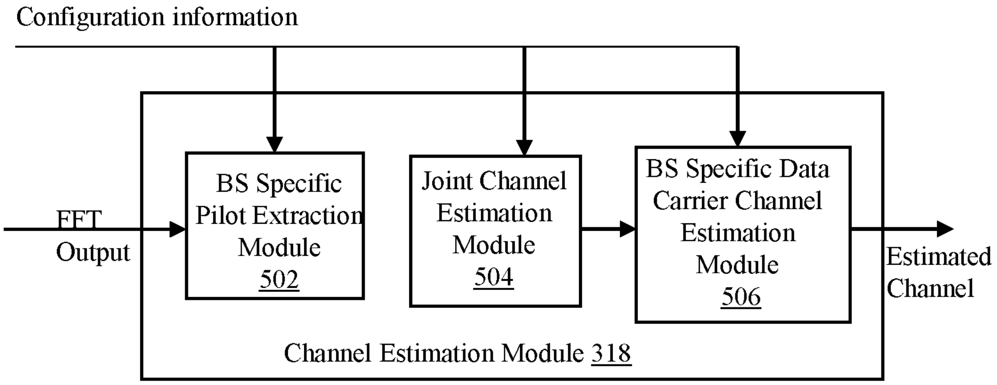
FIG. 5 is a block diagram of a channel estimation module, according to some embodiments herein.

FIG. 5 is a block diagram of the channel estimation module 320, according to the embodiments herein. The channel estimation module 320 includes a broadcast transmitter specific pilot extraction module 502, a joint channel estimation module 504, and a broadcast transmitter specific data carrier channel estimation module 506 as shown in FIG. 5. The broadcast transmitter specific pilot extraction module 502 extracts the pilots from the ATSC pilot locations obtained for specific $D_X$ $D_Y$. The obtained pilot locations correspond to superimposed pilot values of desired broadcast transmitter and the interferers. To obtain channel estimation at these sub carriers joint channel estimation technique is used. The Joint Channel Estimation module 504 estimates the desired channel and the one or more adjacent interfering channels. The broadcast transmitter specific data carrier channel estimation module 506 uses these channel estimates to obtain the channel estimates corresponding to the data subcarriers. Since the time domain precoding filter length is maintained as per the standard, existing receivers may be able to equalize this distortion using linear equalizers.

Figure 6:
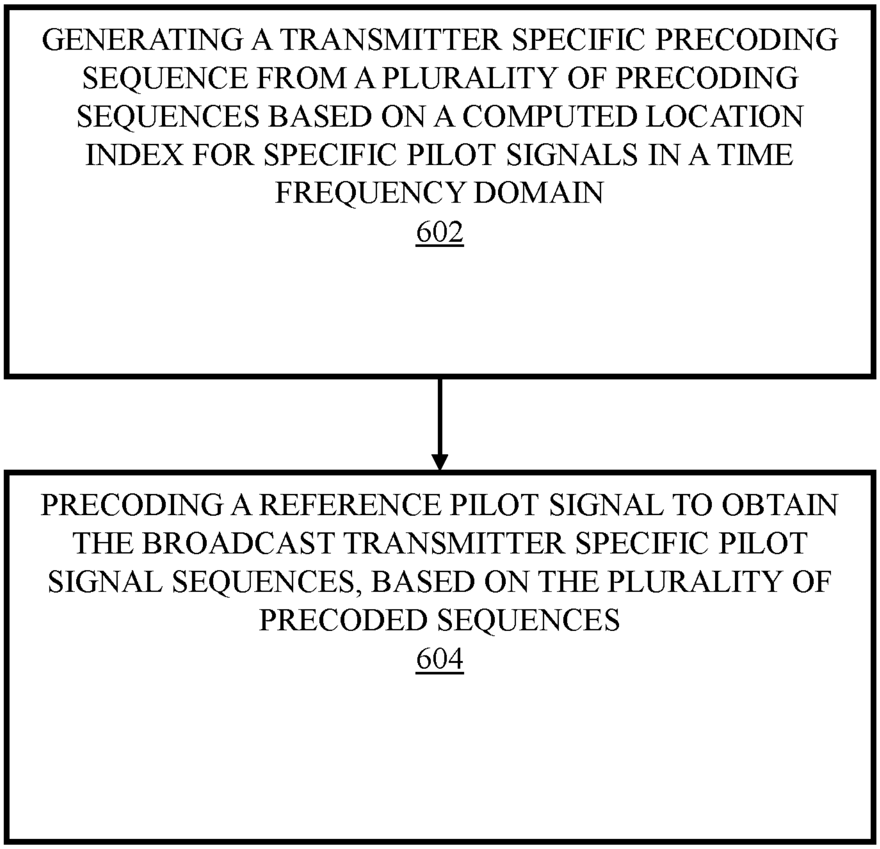
FIG. 6 is a flow chart illustrating a method performed by a Single frequency based broadcast communication system that includes a desired broadcast transmitter and one or more adjacent interfering broadcast transmitters in communication with a receiver over a communication channel according to some embodiments herein.

FIG. 6 is a flow chart illustrating a method performed by the Single frequency based communication system 300 includes the desired broadcast transmitter 304 and the one or more adjacent interfering broadcast transmitters 302A-302F in communication with the receiver 316 over a communication channel according to the embodiments herein. At step 602, a transmitter specific precoding sequence is generated from one or more precoding sequences based on a computed location index for specific pilot signals in a time frequency domain. At step 604, a reference pilot signal is precoded to obtain the broadcast transmitter specific pilot signal sequences, based on the plurality of precoded sequences.

According to alternate embodiments herein, the pilot sequence generation module generates the broadcast transmitter specific pilot sequences using at least one or more sequence generators at different broadcast transmitters and/or Single Frequency Network (SFN) clusters. Wherein the broadcast transmitter specific pilot sequences include one of orthogonal pilot sequences or uncorrelated sequences between the first broadcast transmitter and the second broadcast transmitter. The orthogonal pilot sequences or uncorrelated pilot sequences are generated using sequence generators with different sequence generator polynomials. The pilot sequence generation module further generates broadcast transmitter specific pilot sequences using at least one of a pilot reference generator and a broadcast transmitter specific transmitter identity (TxID) sequence. The broadcast transmitter specific pilot sequences herein are orthogonal pilot sequences or uncorrelated pilot sequences.

Figure 7:
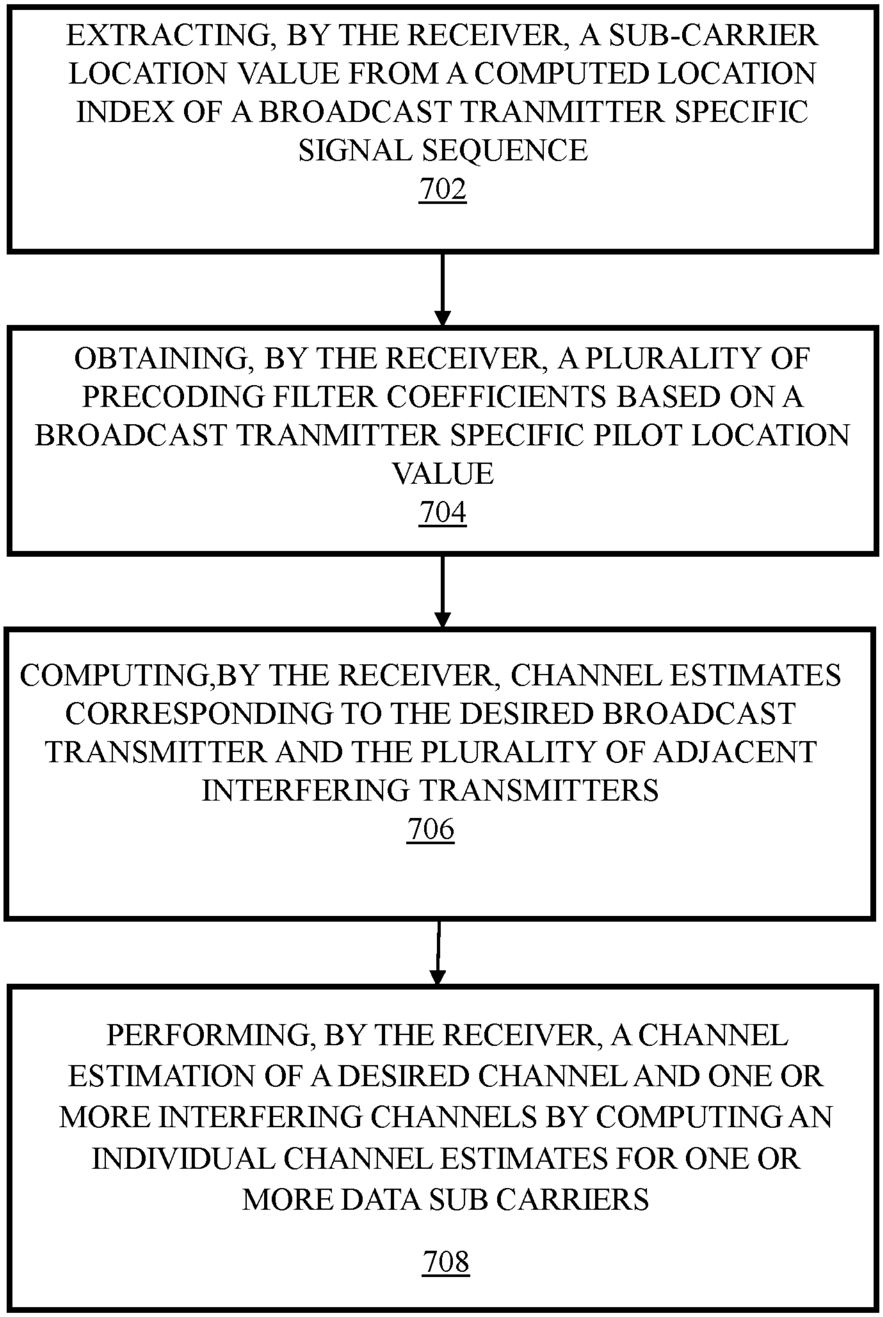
FIG. 7 is a flow chart illustrating an operation of a receiver, according to some embodiments herein.

FIG. 7 is a flow chart illustrating an operation of the receiver 316, according to the embodiments herein. At step 702, a sub-carrier location value is extracted by the receiver 316 from a computed location index of the broadcast transmitter specific signal sequence. The receiver 316 extracts the received pilot sequence values from one or more pilot locations based on one or more spacing parameters. Here the one or more spacing parameters include a frequency-direction spacing and time-direction spacing.

At step 704, one or more precoding filter coefficients are obtained by the receiver 316 based on the broadcast transmitter specific pilot location value. At step 706, Channel estimates corresponding to the desired broadcast transmitter and the one or more adjacent interfering broadcast transmitters are computed by the receiver 314, based on the extracted sub carrier values and the broadcast transmitter specific pilot sequences. At step 708, a channel estimation of a desired channel and one or more interfering channels for the one or more data subcarriers is performed by computing individual channel estimates for a plurality of data sub carriers.

Figure 8:
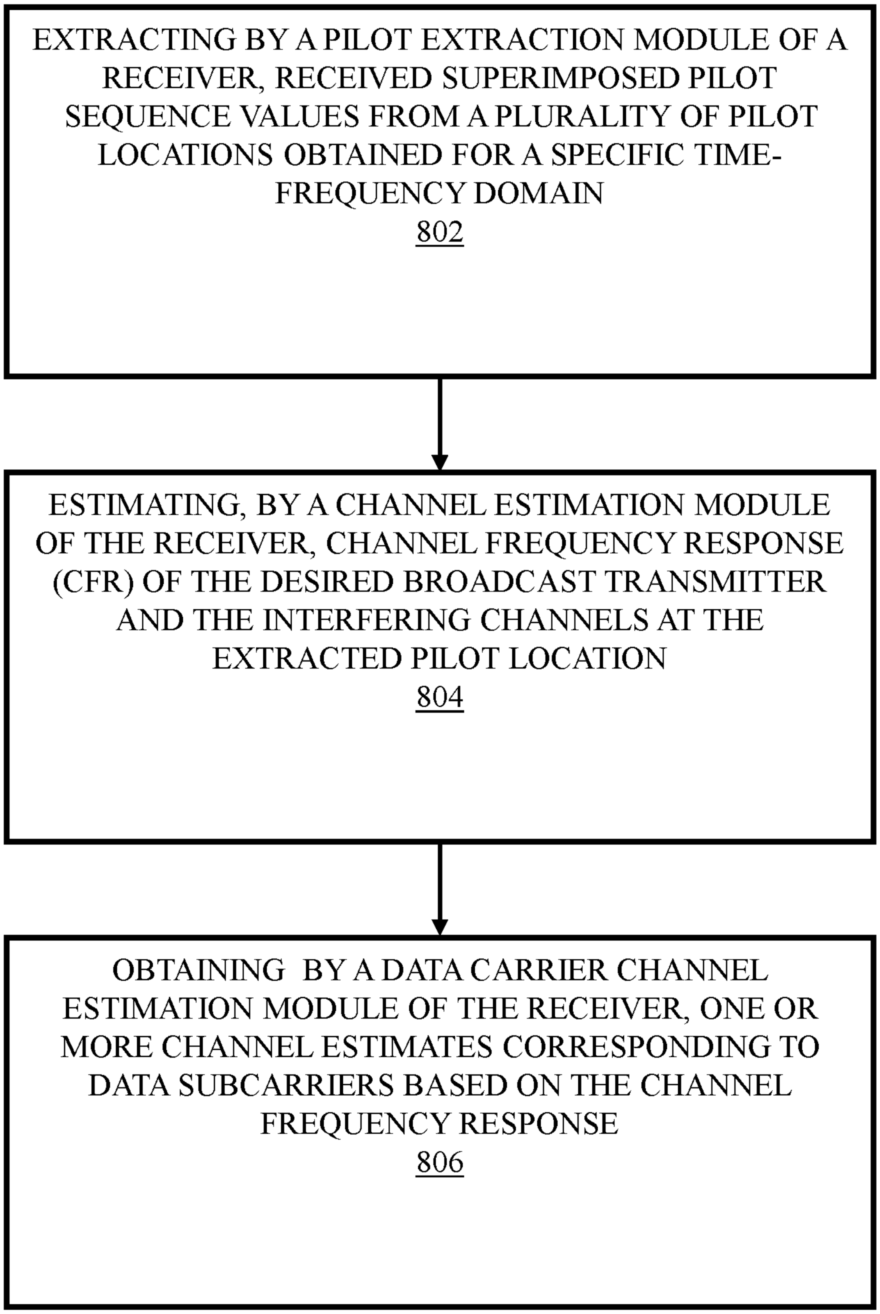
FIG. 8 is a flow chart illustrating a method of performing channel estimation, according to the embodiments herein.

FIG. 8 is a flow chart illustrating a method of performing channel estimation, according to the embodiments herein. At step 802, the pilot extraction module of the receiver 316 extracts the received superimposed pilot sequence values from one or more pilot locations obtained for a specific time-frequency domain. The pilot locations correspond to received superimposed pilot values of the desired broadcast transmitter 304 and an interfering channel. At step 804, the channel estimation module 320 of the receiver 316 estimates a channel frequency response (CFR) of the desired broadcast transmitter and the one or more adjacent interfering channels at the extracted pilot location. Here estimation of the channel response of desired base station and an adjacent interfering broadcast transmitter is performed based on a location of the one or more pre-distorted pilots in the time-frequency domain. At step 806, the data carrier channel estimation module 322 of the receiver 316 obtains one or more channel estimates corresponding to data subcarriers based on a channel frequency.

Figure 9:
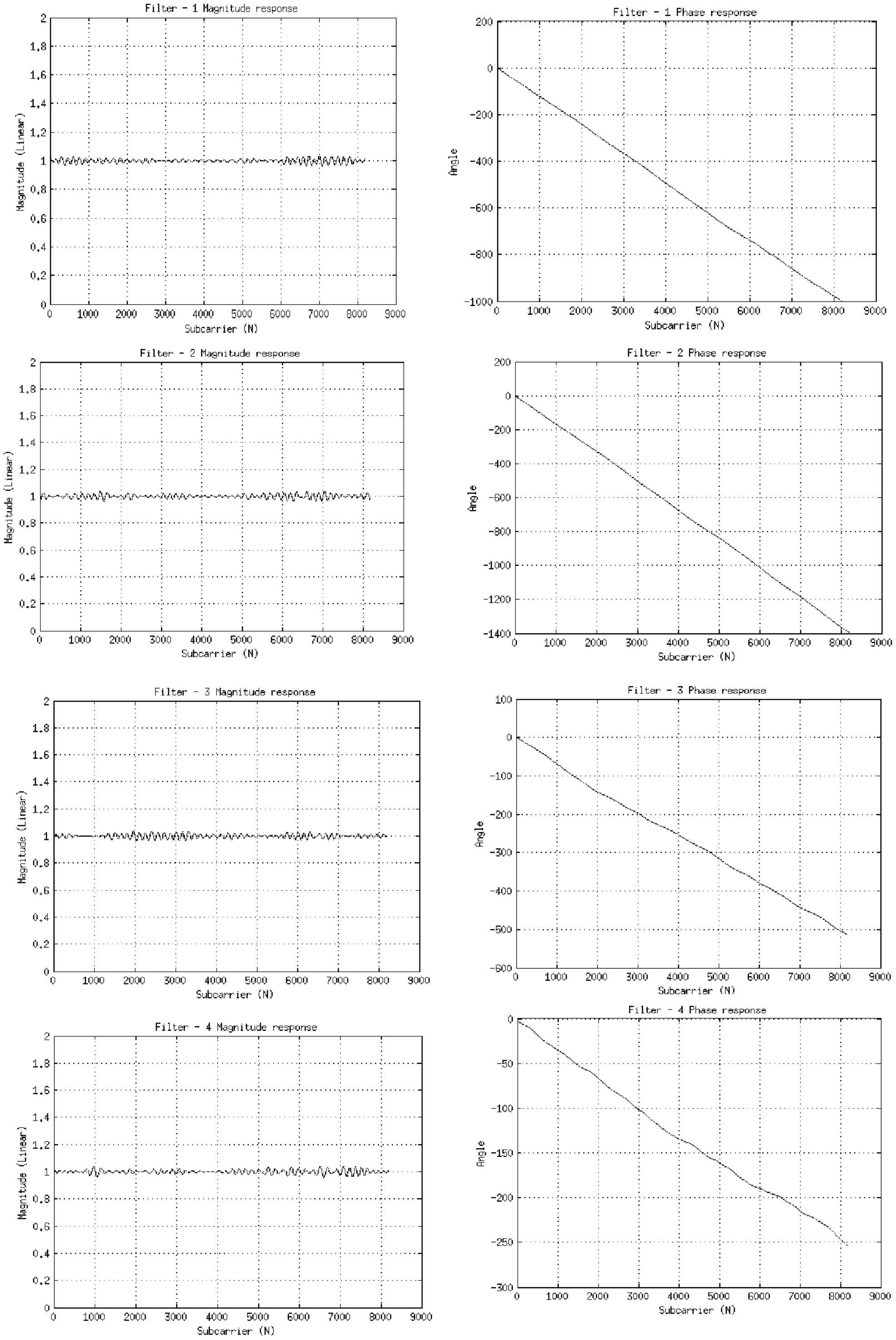
FIG. 9 is a graphical representation of four different precoding frequency responses, according to the embodiments herein.

FIG. 9 is a graphical representation of four different precoding filter frequency responses, according to the embodiments herein. The precoding filter herein is all pass in nature and results in highly uncorrelated or orthogonal scattered pilots (in frequency domain) between broadcast transmitters. Further, the precoding filter has a minimum peak sidelobe level (PSL) in time. The time domain filter lengths are within the standard supported lengths and support 7 or more broadcast transmitter cluster reuse.

Thus, the embodiments herein provide broadcast transmitter specific pilots without changes in the transmitter frame structure of the current broadcast standards operating in SFN mode and also without significant impact on the performance of an existing receiver. This will facilitate the coexistence of receivers in SFN mode and also frequency reuse-1 mode.

The embodiments herein are adapted to facilitate the channel estimation of desired broadcast transmitter and individual adjacent interfering broadcast transmitters with a high degree of accuracy. Existing broadcast communication uses same pilots across all broadcast transmitters. At the receiver 316, the received signal captures the superimposed channel frequency response. If the same pilots are used at all the neighboring broadcast transmitters, then the receiver 316 cannot estimate individual channel frequency response (Channel between a specific broadcast transmitter and the receiver 316. The pre-distorted pilots of neighboring broadcast transmitters will facilitate the estimation of individual channel frequency responses. This is important for estimating the desired data.

According to another embodiment, herein, each broadcast transmitter have a sequence generator that has a different generator polynomial, when compared pith neighbouring broadcast transmitters. The sequence generator uses this generator polynomial and generates sequences of desired lengths. Thus, orthogonal (even length sequences) or uncorrelated sequences (odd length sequences). between two broadcast transmitters can be generated using sequence generators with different generator polynomials.

According to yet another embodiment herein, each broadcast transmitter can have a sequence generator with the same generator polynomial but a different initial sequence. Since the generator polynomial is same, the sequences obtained at different broadcast transmitters can be a shifted version of the sequences from neighbouring broadcast transmitters. However, the pilot sequences obtained from these reference signals can be orthogonal (even length) or highly uncorrelated (odd length). Furthermore, the initial sequence can be the TXID sequence defined in the standard. Each broadcast transmitter has a TxID that is a 13-bit unique sequence. This can be considered as an initial sequence for the generation of reference signals such that the pilot sequences obtained from these reference signals are orthogonal or highly uncorrelated.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments/generic embodiments, those skilled in the art will recognize that the embodiments herein can be practiced with modification within the spirit and scope of the appended claims.

What is claimed is:

1. A Single frequency based broadcast communication system comprising:

a desired broadcast transmitter and a plurality of adjacent interfering broadcast transmitters that are in communication with a receiver over a communication channel, wherein the desired broadcast transmitter comprising a waveform generator for transmitting broadcast transmitter specific pilot signals to the receiver, wherein the receiver receives a superimposed signal of the transmitted broadcast transmitter specific pilot signals, wherein the desired broadcast transmitter is one of the broadcast transmitters from which mobile station intends to receive data and each adjacent interfering broadcast transmitter comprises a pilot insertion module and a precoding filter module and the desired broadcast transmitter comprises a pilot insertion module and a precoding filter module, wherein the precoding filter module is designed to:

generate a transmitter specific precoding sequence from a plurality of precoding sequences based on a computed location index for specific pilot signals that identifies sub carrier location values in a time frequency domain, wherein the computed location index is derived from pilot spacing parameters;

precode a reference pilot signal to obtain the broadcast transmitter specific pilot signal sequences, based on the plurality of precoded sequences, wherein precoding of the reference pilot signal comprises obtaining broadcast transmitter specific pilot modulation values that are orthogonal or quasi-orthogonal to the other pre-coded plurality of pilot signals of adjacent broadcast transmitters in a frequency domain, and wherein the transmitter specific pilot signal sequences are used by the receiver to estimate channels of the desired broadcast transmitter and the plurality of adjacent interfering broadcast transmitters.

2. The system of claim 1, wherein the receiver on receiving the broadcast transmitter specific pilot signal sequence transmitted from the desired broadcast transmitter and at least one of the plurality of adjacent interfering broadcast transmitters is adapted to:

extract the sub-carrier location values from the computed location index of the broadcast transmitter specific pilot signal sequence;

obtain a plurality of precoding filter coefficients based on the broadcast transmitter specific pilot location value;

compute channel estimates corresponding to the desired broadcast transmitter and the plurality of adjacent interfering broadcast transmitters, based on the extracted sub-carrier location values and the broadcast transmitter specific pilot signal sequences; and compute an individual channel estimate for a plurality of data sub carriers and obtain Channel Frequency Response (CFR) and a Channel Impulse Response (CIR) of desired and interfering channels.

3. The system of claim 2, wherein the receiver is adapted to estimate the desired broadcast transmitter and the plurality of adjacent interfering broadcast transmitters, wherein the receiver comprises:

a pilot extraction module that is configured to extract the received pilot sequence from the pilot locations obtained for a specific time-frequency domain, where the obtained pilot locations correspond to superimposed pilot values of the desired broadcast transmitter and the plurality of adjacent interfering broadcast transmitters;

a channel estimation module that is configured to estimate a channel frequency response (CFR) of the desired broadcast transmitter and the plurality of adjacent interfering broadcast transmitters, from the extracted pilot sequence; and a data carrier channel estimation module that is configured to obtain one or more channel estimates corresponding to data subcarriers based on a channel frequency response.

4. The system of claim 3, wherein the channel estimation module estimates the channel frequency responses of the desired based station and the plurality of adjacent interfering broadcast transmitters based on a location of a plurality of pre-distorted pilots in a time-frequency domain.

5. The system of claim 1, wherein the pilot sequence generation module of the transmitter is further adapted to:

generate the broadcast transmitter specific pilot signal sequences using at least one of one or more sequence generators at different broadcast transmitters and Single Frequency Network (SFN) clusters.

6. The system of claim 1, wherein the broadcast transmitter specific pilot signal sequences comprise one of orthogonal pilot sequences or uncorrelated pilot sequences between the first broadcast transmitter and the second broadcast transmitter, wherein the orthogonal pilot sequences or uncorrelated pilot sequences are generated using sequence generators with different sequence generator polynomials.

7. The system of claim 1, wherein the pilot sequence generation module of the transmitter is further adapted to:

generate broadcast transmitter specific pilot sequences using at least one of a pilot reference generator and a broadcast transmitter specific transmitter identity (TxID) sequence, where the broadcast transmitter specific pilot sequences are orthogonal pilot sequences or uncorrelated pilot sequences.

8. A method performed by a Single frequency based broadcast communication system comprising a desired broadcast transmitter and a plurality of adjacent interfering broadcast transmitters in communication with a receiver over a communication channel, wherein each of the broadcast transmitters comprising a waveform generator for transmitting broadcast transmitter specific pilot signals to the receiver for receiving a superimposed transmitted broadcast transmitter specific pilot signals, characterized in that, a desired broadcast transmitter is one of the broadcast transmitters from which mobile station intends to receive data and each broadcast transmitter comprises a pilot insertion module and a precoding filter module, wherein the method comprises:

generating a transmitter specific precoding sequence from a plurality of precoding sequences based on a computed location index for specific pilot signals that identifies sub carrier location values in a time frequency domain, wherein the computed location index is derived from pilot spacing parameters;

precoding a reference pilot signal to obtain the broadcast transmitter specific pilot signal sequences, based on the plurality of precoded sequences, wherein precoding of the reference pilot signal comprises obtaining broadcast transmitter specific pilot modulation values that are orthogonal or quasi-orthogonal to the other pre-coded plurality of pilot signals of adjacent broadcast transmitters in a frequency domain, and wherein the transmitter specific pilot signal sequences are used by the receiver to estimate channels of the desired broadcast transmitter and the plurality of adjacent interfering broadcast transmitters.

9. The method of claim 8, wherein the method comprises extracting, by the receiver, the sub-carrier location values from the computed location index of the broadcast transmitter specific pilot signal sequence;

obtaining, by the receiver, a plurality of precoding filter coefficients based on the broadcast transmitter specific pilot location value;

computing, by the receiver, Channel estimates corresponding to the desired broadcast transmitter and the plurality of adjacent interfering broadcast transmitters, based on the extracted sub-carrier location values and the broadcast transmitter specific pilot sequences; and performing, by the receiver, a channel estimation of a desired channel and one or more interfering channels by computing an individual channel estimate for a plurality of data sub carriers.

10. The method of claim 9, wherein performing the channel estimation of the one or more interfering channels comprises:

extracting, by a pilot extraction module of the receiver, the received superimposed pilot sequence values from a plurality of pilot locations obtained for a specific time-frequency domain; where the pilot locations correspond to received superimposed pilot values of a desired broadcast transmitter and an interfering channel;

estimating, by a channel estimation module of the receiver, channel frequency response (CFR) of the desired broadcast transmitter and the interfering channels at the extracted pilot location; and obtaining, by a data carrier channel estimation module (320) of the receiver, one or more channel estimates corresponding to data subcarriers based on a channel frequency.

11. The method of claim 8, wherein the method comprises generating, by the pilot sequence generation module, the broadcast transmitter specific pilot signal sequences using at least one of one or more sequence generators at different broadcast transmitters and Single Frequency Network (SFN) clusters.

12. The method of claim 11, wherein the broadcast transmitter specific pilot signal sequences comprise one of orthogonal pilot sequences or uncorrelated sequences between a first adjacent interfering broadcast transmitter and a second adjacent interfering broadcast transmitter, wherein the orthogonal pilot sequences or uncorrelated pilot sequences are generated using sequence generators with different sequence generator polynomials.

13. The method of claim 8, wherein the method comprises generating, by the pilot sequence generation module, the broadcast transmitter specific pilot sequences using at least one of a pilot reference generator and a broadcast transmitter specific transmitter identity (TxID) sequence, where the broadcast transmitter specific pilot sequences are orthogonal pilot sequences or uncorrelated pilot sequences.

* * * * *